United States Patent
Shinde et al.

(10) Patent No.: US 9,471,716 B2
(45) Date of Patent: Oct. 18, 2016

(54) SETTING METHOD AND INFORMATION PROCESSING APPARATUS

(71) Applicant: FUJITSU LIMITED, Kawasaki-shi, Kanagawa (JP)

(72) Inventors: Takamasa Shinde, Kawasaki (JP); Makoto Sakairi, Yokohama (JP); Kazuhisa Inagaki, Yokohama (JP); Akihiko Fujisaki, Kawasaki (JP); Tetsuyuki Kubota, London (GB); Sachiko Furuya, Kawasaki (JP); Hidehisa Sakai, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 464 days.

(21) Appl. No.: 14/041,797

(22) Filed: Sep. 30, 2013

(65) Prior Publication Data
US 2014/0142899 A1 May 22, 2014

(30) Foreign Application Priority Data

Nov. 22, 2012 (JP) ................................. 2012-256265

(51) Int. Cl.
*G06F 17/50* (2006.01)

(52) U.S. Cl.
CPC ........... *G06F 17/50* (2013.01); *G06F 17/5086* (2013.01); *G06F 2217/06* (2013.01); *G06F 2217/12* (2013.01); *Y02P 90/265* (2015.11)

(58) Field of Classification Search
CPC .............. G06F 17/50; G06F 17/5086; G06F 2217/06; G06F 2217/12; Y02P 90/265
See application file for complete search history.

(56) References Cited

U.S. PATENT DOCUMENTS

| | | | |
|---|---|---|---|
| 2006/0028465 A1* | 2/2006 | Imai | G06T 19/00 345/419 |
| 2006/0142979 A1* | 6/2006 | Imai | G06F 17/5018 703/2 |
| 2007/0198587 A1 | 8/2007 | Kobayashi et al. | |
| 2011/0313733 A1* | 12/2011 | Sakairi | G06F 17/5018 703/1 |

FOREIGN PATENT DOCUMENTS

| | | |
|---|---|---|
| JP | 2007-213258 | 8/2007 |
| JP | 2007-233585 A | 9/2007 |
| JP | 2008-134943 | 6/2008 |

OTHER PUBLICATIONS

Office Action issued on Mar. 29, 2016 in Japanese Patent Application No. 2012-256265 (with partial English language translation).

* cited by examiner

*Primary Examiner* — Aniss Chad
*Assistant Examiner* — Russ Guill
(74) *Attorney, Agent, or Firm* — Oblon, McClelland, Maier & Neustadt, L.L.P.

(57) ABSTRACT

A disclosed setting method includes: in response to an instruction to replace a first component with a second component, determining whether or not data that correlates a surface of the first component with a surface of a third component has been set; upon determining that the data that correlates the surface of the first component with the surface of the third component has been set, extracting a surface of the second component, which corresponds to the surface of the first component; and correlating the extracted surface of the second component with the surface of the third component instead of the surface of the first component in the data.

5 Claims, 7 Drawing Sheets

| SURFACE1 | SURFACE2 | CONTACT CONDITION |
|---|---|---|
| A1 | B1 | CCC |
| D2 | E2 | FFF |
| ⋮ | ⋮ | ⋮ |

| SURFACE1 | SURFACE2 | CONTACT CONDITION |
|---|---|---|
| D2 | E2 | FFF |
| ⋮ | ⋮ | ⋮ |

FIG.12

| SURFACE1 | SURFACE2 | CONTACT CONDITION |
|---|---|---|
| C3 | B1 | CCC |
| D2 | E2 | FFF |
| ⋮ | ⋮ | ⋮ |

SETTING METHOD AND INFORMATION PROCESSING APPARATUS

CROSS-REFERENCE TO RELATED APPLICATIONS

This application is based upon and claims the benefit of priority of the prior Japanese Patent Application No. 2012-256265, filed on Nov. 22, 2012, the entire contents of which are incorporated herein by reference.

FIELD

This invention relates to a contact analysis technique.

BACKGROUND

In recent years, in the field of structural design, design verification is performed using structural analysis. Particularly, the contact analysis is included in the design verification for an apparatus that is assembled using plural components, and in the contact analysis, contact conditions are set for several thousand locations.

Figure 1:
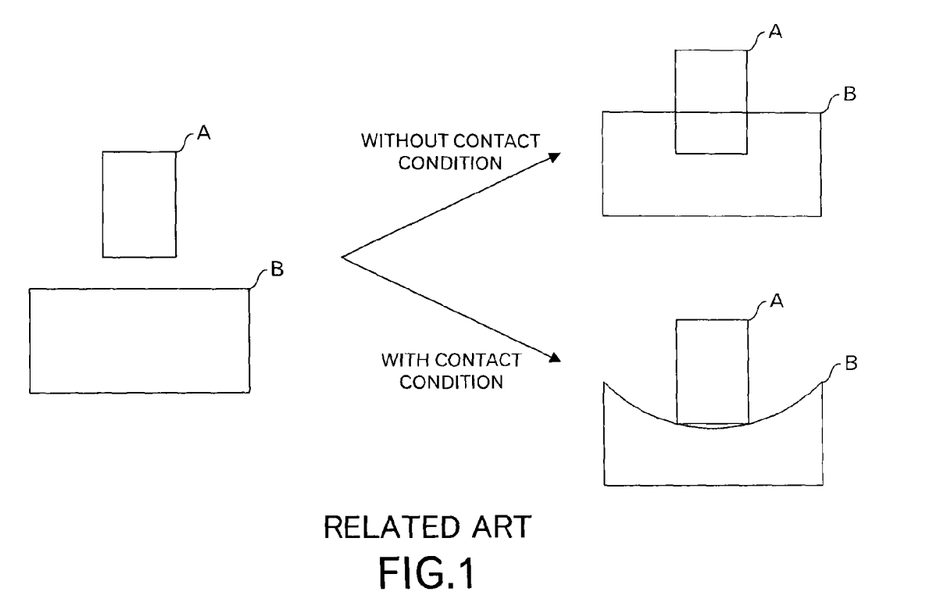
FIG. 1 is a diagram to explain a related art.

The contact analysis simulates, on a computer, the compositive changes in shape, which occur due to friction in coupling portions of components or due to contact between components. Therefore, in the contact analysis, in case where two components, A and B, collide as schematically illustrated on the left side of FIG. 1, it is not possible to adequately simulate the change in shape of the components due to the collision, if the components slip through each other as schematically illustrated at the top on the right side in FIG. 1. Consequently, as schematically illustrated at the bottom on the right side in FIG. 1, in order to be able to simulate the change in shape due to the collision between the bottom surface of component A and the top surface of component B, the coefficient of friction and other contact conditions are preset for this kind of surface pair.

Such contact conditions may be set beforehand by manually estimating the analysis results based on the visual inspection of the user, or may be set by setting the distance between surfaces as a search condition, and then automatically extracting the surface pairs within the preset distance. However, in the case of using just the distance between surfaces as a search condition, there are problems in that when the preset distance is set to a short distance, it is not possible to extract the actual surface pair between contacting components, and when the preset distance is set to a long distance, the number of surface pairs becomes extremely great, and the computation time becomes very long. Therefore, finally, after human confirmation, the contact conditions are set.

Figure 2A:
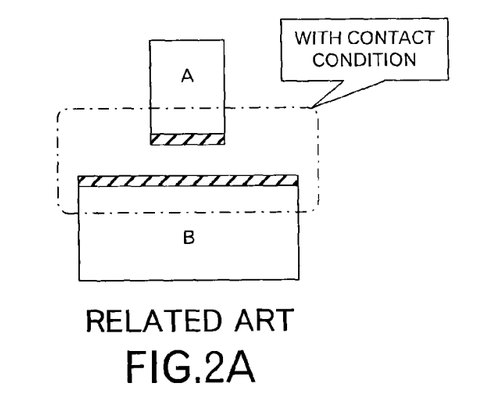
FIG. 2A is a diagram to explain a related art.
Figure 2B:
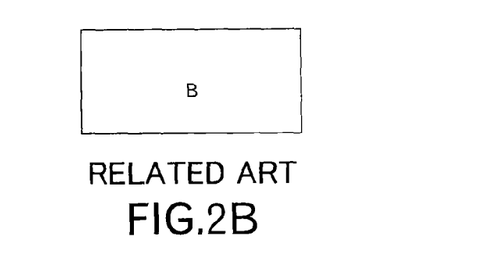
FIG. 2B is a diagram to explain a related art.
Figure 2C:
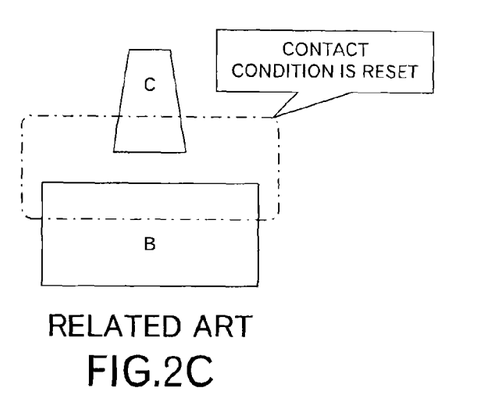
FIG. 2C is a diagram to explain a related art.

Moreover, when a design is changed and components are exchanged, the contact analysis is performed by setting contact conditions again. Conventionally, as schematically illustrated in FIG. 2A, contact conditions are set for the surface pair of the bottom surface (hatched surface) of component A and the top surface (hatched surface) of component B, however, when the component A is eliminated, only the component B remains as schematically illustrated in FIG. 2B, and the contact conditions are also eliminated. Therefore, as schematically illustrated in FIG. 2C, contact conditions are set again for the surface pair that includes the bottom surface of component C and the top surface of the component B.

In the design stage, design changes are performed repeatedly, however, even though almost the same components are exchanged, the contact conditions are repeatedly reset, so setting the contact conditions takes much time.

SUMMARY

A setting method relating to one aspect of this invention includes: (A) in response to an instruction to replace a first component with a second component, determining whether or not data that correlates a surface of the first component with a surface of a third component has been set; (B) upon determining that the data has been set, extracting a surface of the second component, which corresponds to the surface of the first component; and (C) correlating the extracted surface of the second component with the surface of the third component instead of the surface of the first component in the data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 3:
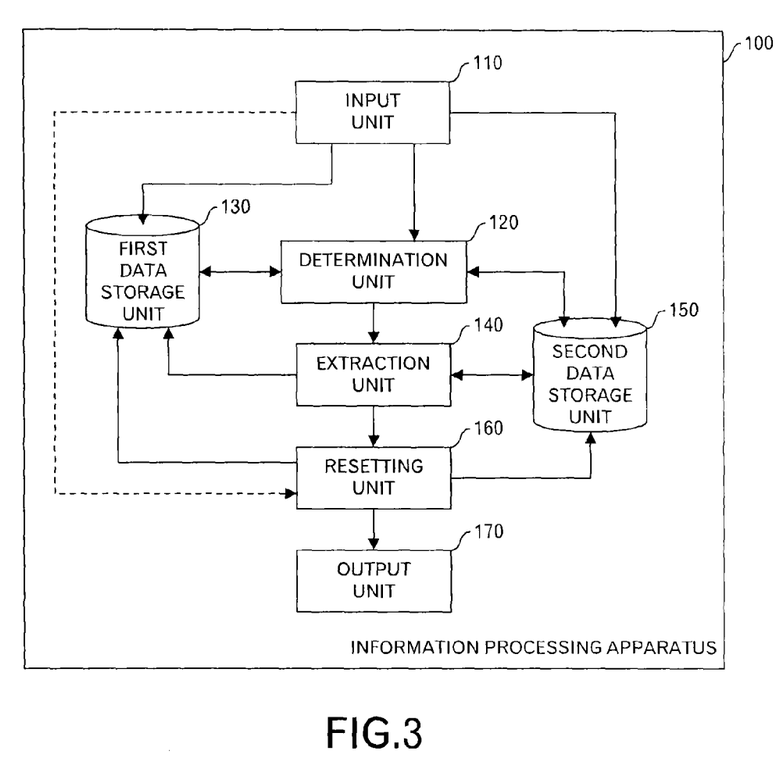
FIG. 3 is a functional block diagram of an information processing apparatus relating to an embodiment of this invention.

FIG. 3 illustrates an information processing apparatus 100 relating to an embodiment of the present invention. The information processing apparatus 100 has an input unit 110, a determination unit 120, a first data storage unit 130, an extraction unit 140, a second data storage unit 150, a resetting unit 160 and an output unit 170.

The input unit 110 receives an instruction, for example, from a user, and in the case of data concerning contact conditions for the contact analysis, the input unit 110 stores the data in the first data storage unit 130, in the case of data concerning components, the input unit 110 stores the data in the second data storage unit 150, and in the case of a replacement instruction, the input unit 110 outputs data concerning the replacement instruction to the determination unit 120. Data concerning the replacement instruction includes an identifier of a component before replacement, identifier of a component after the replacement, shape data of the component after the replacement, disposition data (or location data) of the component after the replacement and the like (for example, coordinate values of each point or vertex).

Figure 4:
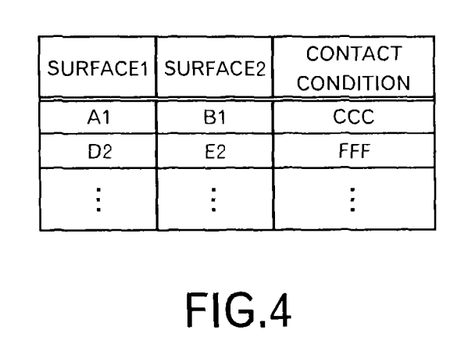
FIG. 4 is a diagram depicting an example of data stored in a first data storage unit.

Data such as illustrated in FIG. 4 is stored in the first data storage unit 130. In the example in FIG. 4, data to identify a surface pair, which includes an identifier for a specific surface of a first component and an identifier for a specific surface of a second component, and contact conditions such as the coefficient of friction are stored.

Data concerning components is stored in the second data storage unit 150. The data concerning components includes an identifier for the component, identifiers for the surfaces included in the component, disposition data (or location data) for the component (for example, coordinate values of each point or vertex).

The determination unit 120 receives data of a replacement instruction from the input unit 110, and performs a processing using data that is stored in the first data storage unit 130. When contact conditions have not been set for the component before the replacement, which is included in the replacement instruction, the determination unit 120 updates data in the second data storage unit 150. Moreover, when contact conditions have already been set for the component before the replacement, which is included in the replacement instruction, the determination unit 120 outputs data of the replacement instruction and data concerning the contact conditions that have been set for the component before the replacement to the extraction unit 140.

When the extraction unit 140 receives the data of the replacement instruction, the extraction unit 140 uses the data that is stored in the second data storage unit 150 to extract a surface of a component after the replacement, which corresponds to the surface of the component before the replacement, which is included in the contact condition data, and outputs data concerning the surface of the component after the replacement and associated contact condition data (or an identifier for the contact condition data) to the resetting unit 160.

The resetting unit 160 replaces the identifier for the surface of the component before the replacement, which is included in the contact condition data relating to the processing, with the identifier for the extracted surface of the component after the replacement, and sets data after the replacement in the first data storage unit 130. The resetting unit 160 may output the contact condition data after the replacement to the output unit 170 and have the data presented to the user, and when a confirmation instruction is received from the input unit 110, the resetting unit 160 may set the data in the first data storage unit 130.

Next, the operation of the information processing apparatus 100 illustrated in FIG. 3 will be explained using FIG. 5 to FIG. 14.

Figure 5:
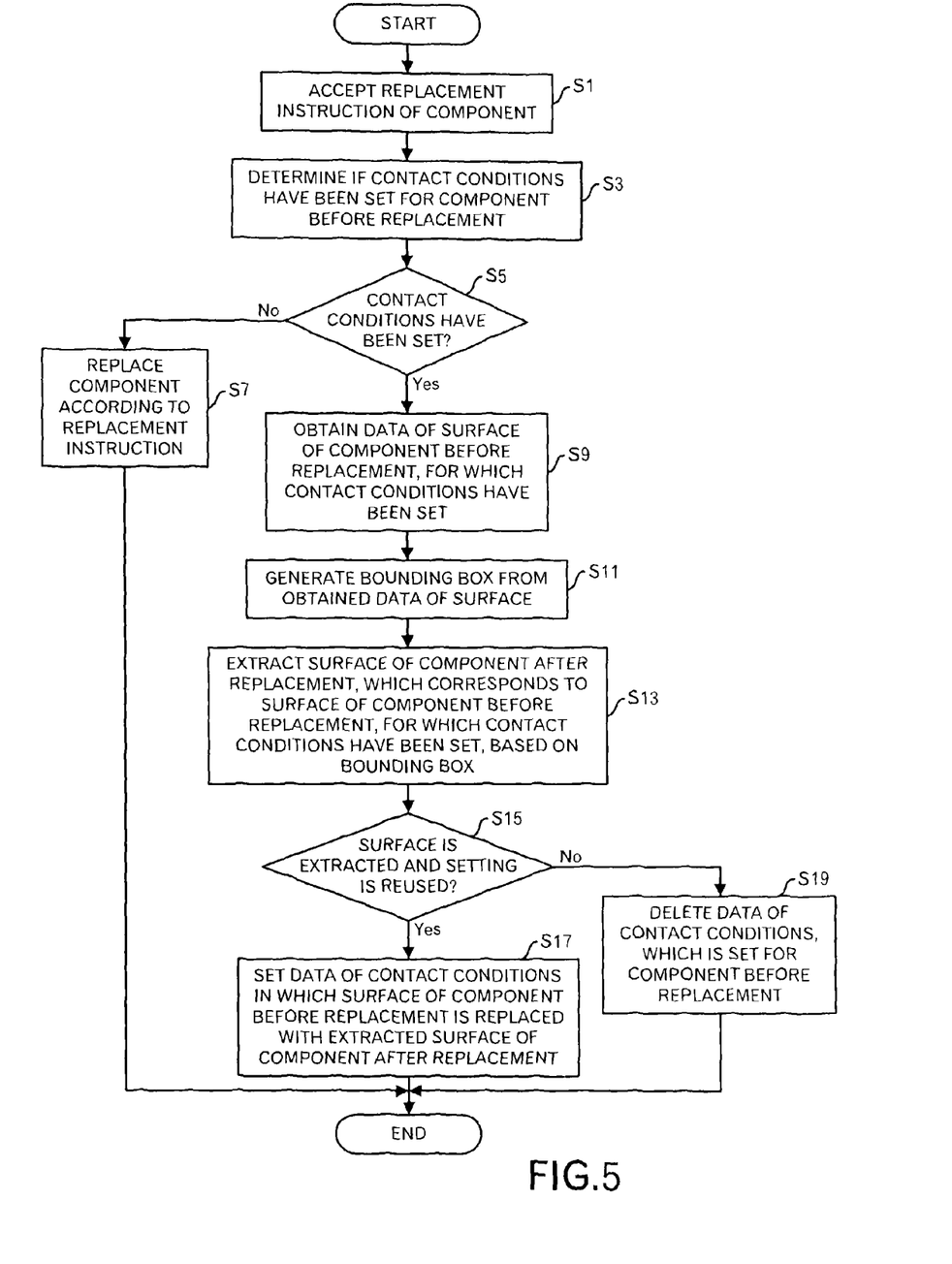
FIG. 5 is a diagram depicting a main processing flow relating to the embodiment.

First, the input unit 110 receives a replacement instruction for a component from the user (FIG. 5: step S1). The replacement instruction includes an identifier for a component before replacement, an identifier for a component after the replacement, shape data and disposition data for the component after the replacement and the like. The input unit 110 then outputs the received data of the replacement instruction to the determination unit 120.

The determination unit 120 determines whether or not contact conditions have been set for the component before the replacement by searching the data stored in the first data storage unit 130 for an identifier for each of the surfaces of the component before the replacement (step S3). The identifier for each of the surfaces of the component before the replacement is extracted, for example, from components data that is stored in the second data storage unit 150.

When the contact conditions are not set for the component before the replacement (step S5: NO route), the determination unit 120 deletes the data for the component before the replacement in the second data storage unit 150 according to the replacement instruction, and stores the data for the component after the replacement in the second data storage unit 150 (step S7). The processing then ends. When contact condition data is set, the contact condition data is inputted independently by way of the input unit 110 and stored in the first data storage unit 130.

On the other hand, when contact conditions have been set for the component before the replacement, the determination unit 120 outputs the contact condition data and the data of the replacement instruction to the extraction unit 140. In response to this, the extraction unit 140 acquires data (shape data, coordinate data and the like) of the surfaces for the component before the replacement, for which the contact conditions have been set, from the second data storage unit 150 (step S9).

Figure 6:
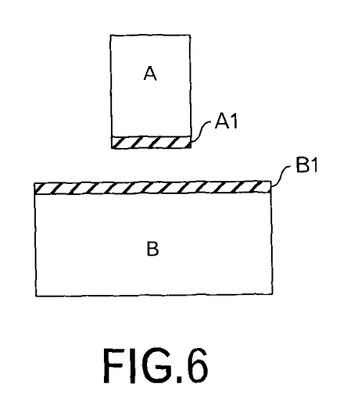
FIG. 6 is a diagram schematically depicting an example of a state for which contact conditions are set.

As schematically illustrated in FIG. 6, presuming that a contact condition is set for the bottom surface A1 of the component A and the top surface B1 of the component B, and the component A is a component before the replacement, then at the step S9, the data for the bottom surface A1 of the component A is read from the second data storage unit 150.

Figure 7:
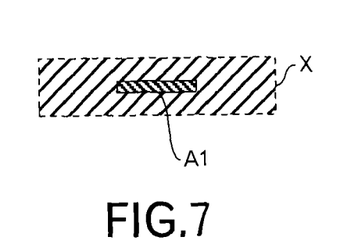
FIG. 7 is a diagram to explain a bounding box including a surface of a component before replacement.
Figure 8:
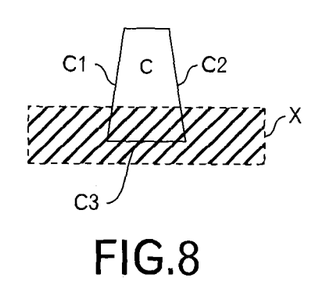
FIG. 8 is a diagram to explain a processing for extracting a surface.

The extraction unit 140 then generates a bounding box (i.e. inclusion rectangular parallelepiped) from the data obtained at the step S9 (step S11). As for the example illustrated in FIG. 6, as illustrated in FIG. 7, the extraction unit 140 generates a bounding box X that is obtained by increasing the size of the smallest bounding box that includes the bottom surface A1 of the component A by just the margin for an error.

Furthermore, based on the bounding box, the extraction unit 140 extracts the surface of the component after the replacement, which corresponds to the surface of the component before the replacement, for which the contact conditions relating to this processing have been set (step S13). More specifically, the extraction unit 140 extracts surfaces of component C after the replacement, of which at least portion is included in the bounding box X. In the example in FIG. 8, the bottom surface C3 and side surfaces C1 and C2 of the component C after the replacement are extracted as the surfaces that are included in the bounding box X.

Figure 9:
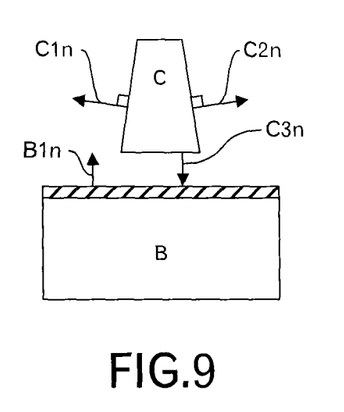
FIG. 9 is a diagram to explain a processing for extracting a surface.
Figure 10:
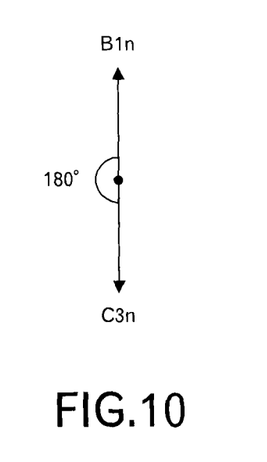
FIG. 10 is a diagram to explain a processing for extracting a surface.
Figure 11:
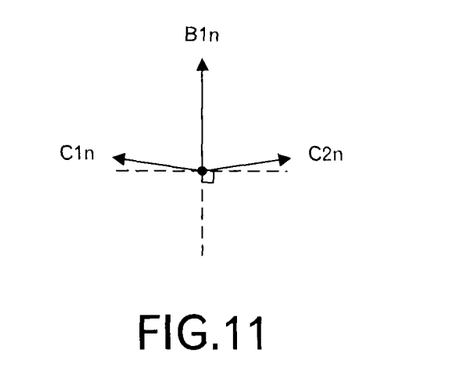
FIG. 11 is a diagram to explain a processing for extracting a surface.

Then, as schematically illustrated in FIG. 9, the surface whose normal line, which is one of the normal line C1$n$ to C3$n$, forms an angle with the normal line B1$n$ of surface B1 of the other component B, which is equal to or greater than a predetermined threshold value, is identified from among the extracted surfaces C1 to C3 as a surface of a component after the replacement, which corresponds to a component before the replacement for which the contact condition relating to this processing is set. As for the example of FIG. 9, when 90 degrees is used as the threshold value, as illustrated in FIG. 10, the normal line B1$n$ and normal line C3$n$ form an angle of 180 degrees, so the surface C3 having the normal line C3n is identified. On the other hand, as illustrated in FIG. 11, the angle formed between the normal lines C2n or C1n and the normal line B1n is less than 90 degrees, so the surfaces C2 and C1 are not identified at this step.

In this embodiment, after the surface of the component after the replacement have been extracted at the step S13, the extraction unit 140 outputs the identifier of the surface and the contact condition data relating to this processing to the resetting unit 160.

Figure 12:
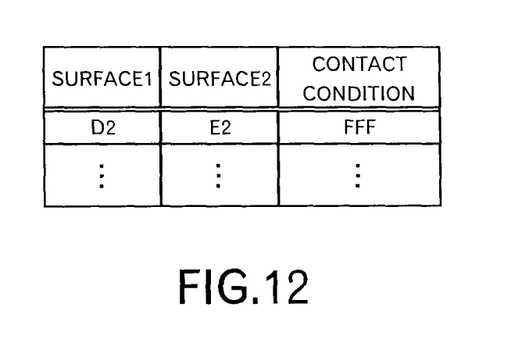
FIG. 12 is a diagram depicting an example of changing data stored in the first data storage unit.

When any surface was not extracted at the step S13 (step S15: NO route), the extraction unit 140 deletes the contact condition data that has been set for the component before the replacement in the first data storage unit 130, deletes the data for the component before the replacement and stores data for the component after the replacement in the second data storage unit 150 (step S19). The processing then ends. In the example in FIG. 4, as illustrated in FIG. 12, the contact condition data in the first line is deleted, for example.

When the resetting unit 160 outputs data for the surface extracted at the step S13 to the output unit 170, and the user instructs by way of the input unit 110 that the contact condition will not be reused (step S15; NO route), the resetting unit 160 may perform the step S19.

On the other hand, when a surface was extracted at the step S13 and reuse of the contact condition was automatically performed, or when the resetting unit 160 outputs the data for the surface, which was extracted at the step S13 to the output unit 170, and the user instructs by way of the input unit 110 that the contact condition is to be reused (step S15: YES route), the processing moves to step S17.

Figure 13:
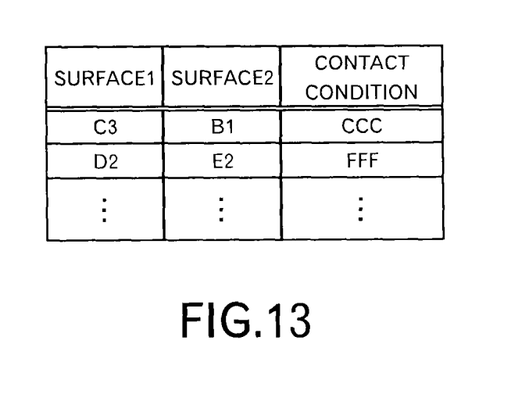
FIG. 13 is a diagram depicting an example of changing data stored in the first data storage unit.

In other words, the resetting unit 160 replaces the surface of the component before the replacement with the extracted surface of the component after the replacement in the contact condition data relating to this processing, and stores the contact condition data after this replacement in the first data storage unit 130 (step S17). Moreover, the resetting unit 160 deletes the data for the component before the replacement from the second data storage unit 150 and stores the data for the component after the replacement in the second data storage unit 150. The processing then ends. As for the example in FIG. 4, as illustrated in FIG. 13, the surface A1 of the component A is replaced by the surface C3 of the component C in the field of "surface 1" in the first line of the contact condition data, for example.

Figure 14:
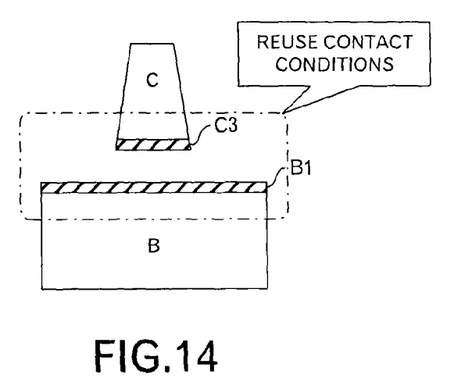
FIG. 14 is a diagram to explain reuse of the contact conditions.

By executing the step S17 in this way, as is schematically illustrated in FIG. 14, the bottom surface C3 of the component C that is introduced instead of the component A is correlated with the top surface B1 of the component B that was not replaced, and the prior contact condition can be reused. In other words, a contact condition does not have to be set separately, so work load can be reduced.

By performing this kind of processing, even when the component is replaced, it is possible to eliminate the need for a person to set the contact conditions by reusing the contact condition in case where conditions to reuse the contact conditions are satisfied, and as a result, it is possible to reduce the amount of work load required.

Although the embodiment of this technique was explained, this invention is not limited to the embodiment. For example, the functional block configuration illustrated in FIG. 3 may not always correspond to the program module configuration. In addition, as for the processing flow, as long as the processing result does not change, the turns of the steps may be exchanged, and plural steps may be executed in parallel.

Moreover, the functions of the aforementioned information processing apparatus 100 may be implemented by plural computers instead of one computer. Furthermore, a client-server type system including the aforementioned functions may be employed instead of a stand-alone type information processing apparatus.

Figure 15:
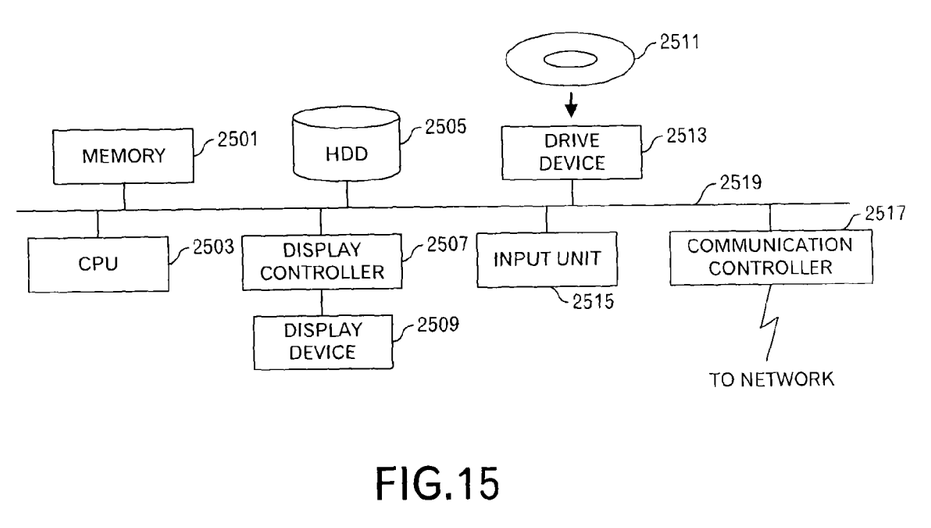
FIG. 15 is a functional block diagram of a computer.

In addition, the information processing apparatus 100 is a computer device as illustrated in FIG. 15. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 15. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

A setting method relating to the embodiments includes: (A) in response to an instruction to replace a first component with a second component, determining whether or not data that correlates a surface of the first component with a surface of a third component has been set; (B) upon determining that the data has been set, extracting a surface of the second component, which corresponds to the surface of the first component; and (C) correlating the extracted surface of the second component with the surface of the third component instead of the surface of the first component in the data.

With this configuration, it is possible to reduce user's work load without newly setting data to correlate the surface of the second component with the surface of the third component.

Moreover, the aforementioned extracting may include: (b1) identifying an area that includes the surface of the first component; (b2) identifying surfaces of which at least portion is included in the identified area from among surfaces of the second component; and (b3) identifying a surface that has a predetermined relation with the surface of the third component from among the identified surfaces. Thus, it becomes possible to identify an appropriate surface of the second component, which corresponds to the surface of the first component.

Furthermore, the aforementioned predetermined relation may be a relation that a surface to be identified has a normal line that has an angle with a normal line of the surface of the third component, which is equal to or greater than a predetermined threshold. By employing such a relation, it becomes possible to identify two surfaces that have high possibility to contact each other and are opposite to each other.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process for changing contact condition data used in contact analysis between components, according to a design change, the process comprising:
   in response to an instruction to replace a first component with a second component by the design change, determining whether contact condition data that correlates a surface of the first component with a surface of a third component that is different from the second component has been set;
   upon determining that the contact condition data has been set, extracting a surface of the second component, which corresponds to the surface of the first component included in the contact condition data and is to be contacted in the contact analysis with the third component; and
   changing the contact condition data so as to correlate the extracted surface of the second component with the surface of the third component instead of the surface of the first component.

2. The computer-readable, non-transitory storage medium as set forth in claim 1, wherein the extracting comprises:
   identifying an area that includes the surface of the first component;
   identifying surfaces of which at least a portion is included in the identified area from among surfaces of the second component; and
   identifying a surface that has a predetermined relation with the surface of the third component from among the identified surfaces.

3. The computer-readable, non-transitory storage medium as set forth in claim 2, wherein the predetermined relation is a relation that a surface to be identified has a normal line that has an angle with a normal line of the surface of the third component, which is equal to or greater than a predetermined threshold.

4. A method for changing contact condition data used in contact analysis between components, according to a design change, the method comprising:
   in response to an instruction to replace a first component with a second component by the design change, determining, by using a computer, whether contact condition data that correlates a surface of the first component with a surface of a third component that is different from the second component has been set;
   upon determining that the contact condition data has been set, extracting, by using the computer, a surface of the second component, which corresponds to the surface of the first component included in the contact condition data and is to be contacted in the contact analysis with the third component; and
   changing, by using the computer, the contact condition data so as to correlate the extracted surface of the second component with the surface of the third component instead of the surface of the first component.

5. An information processing apparatus for changing contact condition data used in contact analysis between components, according to a design change, the information processing apparatus comprising:
   a memory; and
   a processor coupled to the memory and configured to:
      in response to an instruction to replace a first component with a second component by the design change, determine whether contact condition data that correlates a surface of the first component with a surface of a third component that is different from the second component has been set;
      upon determining that the contact condition data has been set, extract a surface of the second component, which corresponds to the surface of the first component included in the contact condition data and is to be contacted in the contact analysis with the third component; and
      change the contact condition data so as to correlate the extracted surface of the second component with the surface of the third component instead of the surface of the first component.

* * * * *